(12) United States Patent
Brodeur

(10) Patent No.: US 6,525,434 B2
(45) Date of Patent: Feb. 25, 2003

(54) BINARY DEMAND SWITCHING CIRCUIT

(76) Inventor: Lester R. Brodeur, 135 Bush Hill Rd., Hudson, NH (US) 03051

( * ) Notice: Subject to any disclaimer, the term of this patent is extended or adjusted under 35 U.S.C. 154(b) by 0 days.

(21) Appl. No.: 10/038,052

(22) Filed: Jan. 4, 2002

(65) Prior Publication Data

US 2002/0113495 A1 Aug. 22, 2002

Related U.S. Application Data

(63) Continuation of application No. 09/267,866, filed on Mar. 12, 1999.
(60) Provisional application No. 60/107,737, filed on Nov. 10, 1998.

(51) Int. Cl.$^7$ ................................................. H02J 1/00
(52) U.S. Cl. ........................................... 307/39; 307/87
(58) Field of Search ............................. 307/39, 38, 87, 307/83; 363/21.14, 83, 87

(56) References Cited

U.S. PATENT DOCUMENTS

| | | | | |
|---|---|---|---|---|
| 5,424,932 A | * | 6/1995 | Inou et al. ................... | 363/127 |
| 5,619,403 A | * | 4/1997 | Ishikawa et al. ............ | 363/131 |
| 5,841,641 A | * | 11/1998 | Faulk ....................... | 363/21.14 |
| 6,330,169 B2 | * | 12/2001 | Mullett et al. ................ | 363/16 |
| 6,342,737 B1 | * | 1/2002 | Brodeur ....................... | 307/87 |

* cited by examiner

Primary Examiner—Shawn Riley
(74) Attorney, Agent, or Firm—Bourque & Associates, P.A.

(57) ABSTRACT

A switching circuit useful in a binary demand feedback DC converter having multiple DC outputs which are all independently regulated using a binary on/off technique is disclosed. A comparator associated with each output compares the voltage at a given output with a reference voltage for the respective given output and generates a first signal the moment the output voltage exceeds the reference voltage. Responding immediately to the first signal a switch opens the converter transformer secondary winding associated with that output from a rectifier and filter. The voltage at that output is determined by the voltage across a capacitor in the filter and the capacitor commences discharging to be below the reference voltage at which time the first signal ceases and the switch reconnects the secondary winding to the rectifier and filter to recommence charging the filter capacitor. A logic OR gate having its inputs connected to all comparators senses the first signal from any one of the comparators and provides a signal that operates a second switch that disconnects a binary switch controller from the converter transformer primary winding until there are no first signals present at the input of the OR gate.

12 Claims, 4 Drawing Sheets

BINARY DEMAND SWITCHING CIRCUIT

RELATED APPLICATION

This application is a continuation of U.S. patent application Ser. No. 09/267,866, filed Mar. 12, 1999. This application is also related to and claims benefit of U.S. Provisional Patent Application No. 60/107,737, entitled "Binary Demand Feedback DC Converter", filed on Nov. 10, 1998.

FIELD OF THE INVENTION

This invention relates to power supplies, particularly to regulation of DC converter power supplies, and more particularly to power supply switching circuits that have binary feedback regulation.

BACKGROUND OF THE INVENTION

In the prior art, DC converters generally utilize pulsed DC power to the primary winding of a transformer in the converter, and the voltage on individual transformer secondary windings is rectified and filtered back to a DC output voltage.

Such DC converters provide a higher power density and increased power throughput than previous power supply technology, partly due to the higher frequency switching rate for the DC voltage applied to the primary winding of the converter transformer. The switching frequency of existing DC converters is in the range of 50–100 KHz. However, increasing the switching frequency of converters beyond the frequency presently used in the art is not practical to achieve greater power density. The converters exceed threshold switching frequencies and tend to become unstable. The instability is usually caused by variations in the electrical load or inadequate phase margin and results in instability in the output voltage level.

Conventionally, a single feedback loop from one of the DC outputs is used as the feedback to control the pulsed DC power delivered to the primary winding of the transformer in order to regulate the DC converter output. This control feedback is commonly an analog, integrated, error signal which is used to control the pulse width of DC pulses input to the converter transformer primary winding in order to maintain the desired output voltage. The feedback can also be binary as described in U.S. Pat. No. 5,260,861 "Digital Controlled Converter and Method" by Harry E. Wert, Nov. 9, 1993.

The shortcoming in the prior art is that the voltage present at DC converter transformer secondary windings is unregulated, except for the voltage output from the one secondary winding that provides the feedback control signal to the circuitry that controls the width of DC pulses input to the converter transformer primary winding. These unregulated outputs are often referred to as "quasi regulated" since there is some degree of regulation against variations in the input DC voltage as a result of sensing the variations at the one regulated output. However, a given change in the pulsed DC voltage on the transformer primary will not, usually, effect the output voltage at all secondary windings of the DC converter transformer in the same proportion. This produces either too much or too little compensation to the "quasi-regulated" DC converter outputs. There is no voltage regulation provided for the quasi-regulated outputs due to load changes on those outputs.

This lack of regulation on some outputs can be overcome by providing each quasi-regulated output with its own independent transformer primary winding with feedback control and circuitry that controls the pulse width of DC pulses input to the primary winding. However, this approach is very expensive. In addition, using separate sets of control circuits as just described results in reduced overall efficiency in that the switching losses and transformer losses of the sum of these individual units is greater, for the same total output power.

A more common approach to solving this problem is to add linear regulators to each of the "quasi-regulated" outputs that requires full regulation. While this approach works there is a substantial reduction in operating efficiency due to the dissipative nature of linear regulators.

In addition, when there is a step load change on an output of a prior art DC\DC converter there is momentary voltage overshoot or undershoot on the particular output depending on if the load is increasing or decreasing. This is partly due to the fact that in the prior art error signals are averaged over a finite period of time before a correction is made to the output voltage.

Thus, there is a need in the art for improved switching circuitsDC that can provide higher power density, improve stability and smaller packaging.

There is also a need in the prior art for simple regulator circuitry in a DC converter that can provide independent regulation of the voltage output from each of multiple outputs of the converter, even under varying loads at each of the outputs, without requiring dissipative regulation circuitry for each output of a converter.

In addition, there is need for a regulator that can prevent or minimize overshoot and undershoot when there is a step load change on the converter outputs.

SUMMARY OF THE INVENTION

The above needs in the prior art and objects of the invention are satisfied or met by the present invention.

The present invention provides an improved switching circuit with improved operating efficiency, higher power density, improved stability, wide loop bandwidth, and smaller packaging than heretofore possible in the art. The invention does this by providing regulation of the voltage output at each of multiple outputs of the converter, even with varying loads at each of the outputs, and can prevent overshoot and undershoot when there is a step load change, while maintaining maximum efficiency under different load currents.

The invention replaces the usual analog or digital feedback error signal from one output of a prior art switching circuit such as used in DC converters, and sometimes voltage regulators associated with others of the outputs, with a binary on/off feedback command from a comparator associated with each output of the converter. The on/off command from a comparator controls the voltage at its associated output, and the on/off commands from each output are combined to create another single on/off feedback command that controls the voltage applied to the primary of the transformer of the converter. The on/off feedback commands only indicate if the voltage at each output of the circuit is above or below a set value. In this manner power dissipative regulator circuits of the prior art are eliminated, and the pulse generator circuitry driving the converter transformer primary is greatly simplified.

This invention is implemented with simple circuitry which reduces parts count and improves the inherent reliability as well as allowing smaller packaging and reduced cost. In addition, the reduced power dissipation of fewer components contributes to smaller size and improved reliability.

More particularly, with the present invention, the voltage at each output is compared to a voltage reference signal for that output by a comparator to obtain a binary error signal which indicates only that the respective output voltage is too high versus too low or in range when compared to the reference signal voltage for that output, and without indicating how much the output voltage is high or low. This binary error signal from each output is used to control a switch that opens the secondary winding of the converter transformer associated with each respective output when the voltage thereat is too high, and controls the switch to leave the secondary winding in the circuit when the output voltage is in range. The in range voltage is defined by the known hysterisis (or dead band) of the error voltage comparator.

The binary error signal from the comparator associated with each output of the converter are combined with a logic gate and used to control the application of a source of energy to the primary winding of the converter transformer. Power is applied to the converter primary winding when at least one binary error signal indicates that its associated output is too low.

In the primary embodiment of the invention the pulsed DC power applied to the converter transformer primary always has a constant frequency and pulse width, unlike prior art DC converters where the frequency or pulse width is changed as part of the regulation. This results in much simpler circuitry.

The binary error signal is used to switch the DC pulses applied to the transformer primary on or off as soon as indicated by the error signal. There is no waiting for the beginning or ending of any pulses. This allows nearly instantaneous converter power change in response to line and/or load variations. Absent is the intentional error delay that conventional converter technology requires to provide loop stability. The binary feedback arrangement of the present invention is inherently stable, without delay or integration, because it is one dimensional—indicating only that output voltage is in or out of range, and not how much it is in or out of range. This equates to an equivalent loop bandwidth that is equal to the converter switch frequency instead of, typically, ten-percent of the switch frequency for conventional feedback control.

Since regulation is achieved by disallowing or blocking converter pulses in one or more transformer secondary windings, efficiency is enhanced by directing the finite pulse power of each converter cycle to the particular secondary winding that requires power.

This novel operation provides full independent regulation of each output of the DC converter while providing high operating efficiency, ideal transient response, and overall simplicity. Additionally, there are no cross regulation problems as experienced with existing DC converters.

It is a characteristic of the DC converter that the ripple amplitude is essentially constant over the design load range. In the prior art the ripple amplitude is maximum at full load and minimum at minimum load.

DESCRIPTION OF THE DRAWING

The invention will be better understood upon reading the following Detailed Description in conjunction with the drawing in which.

DETAILED DESCRIPTION

Figure 1:
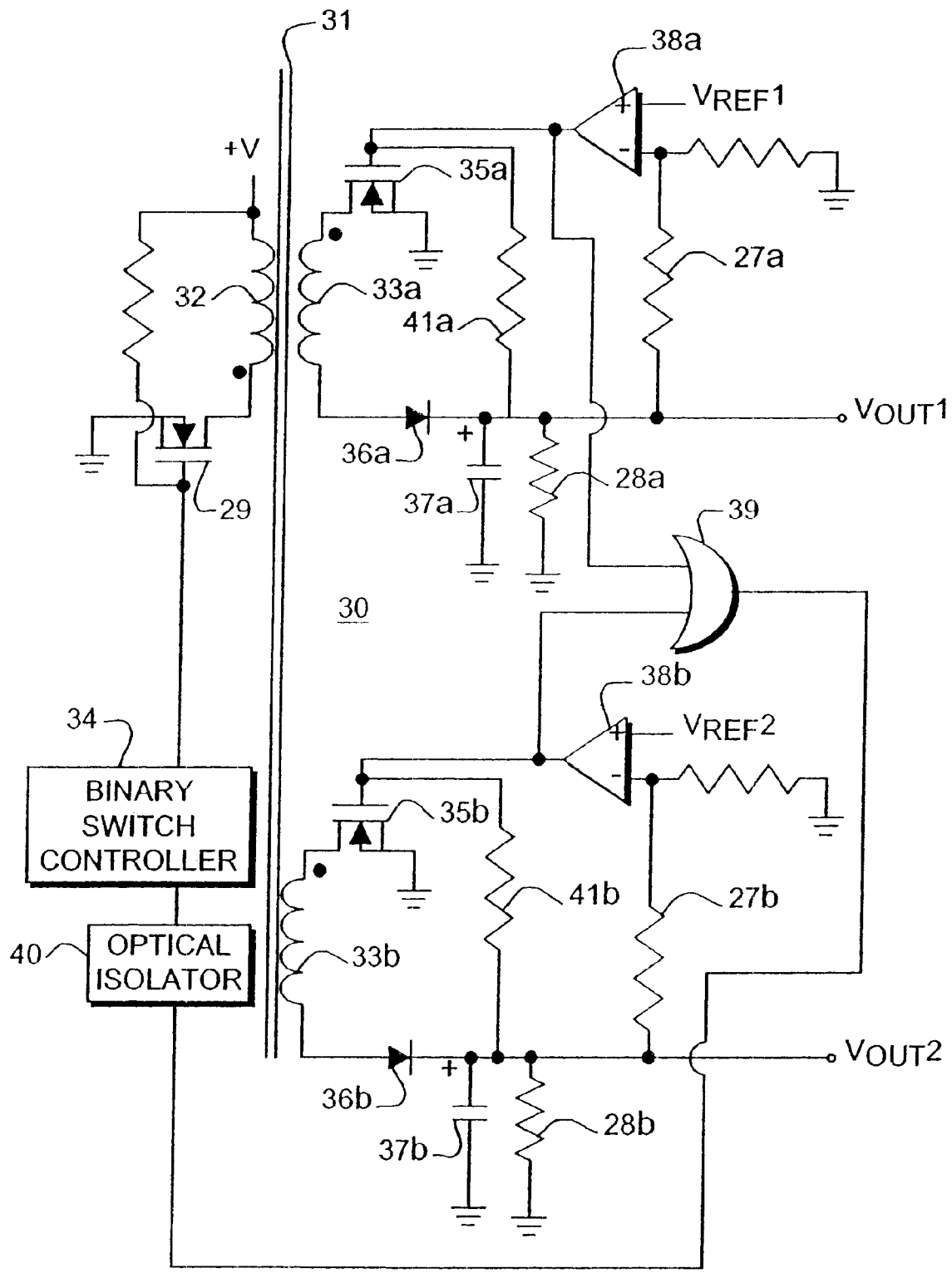
FIG. 1 shows a DC converter utilizing the present invention in accordance with the preferred embodiment of the invention.

FIG. 1 shows a detailed block diagram of a DC converter 30 in accordance with the teaching of the present invention. Although a DC converter is used in the exemplary embodiment to explain the present invention, this is not a limitation of the present invention. Converter 30 has a transformer 31 with a primary winding 32 and secondary windings 33a&b. Each secondary winding is associated with a particular output from converter 30. Two exemplary outputs $V_{out}1$ and $V_{out}2$ are shown in FIG. 1, but more outputs may be provided which are identical to the outputs shown. One end of primary winding 32 has voltage connected thereto and the other end is connected to ground through a field effect transistor (FET) 29. When FET 29 is not conducting there is no square wave DC signal or other source of energy applied to primary winding 32 and, accordingly there is no signal voltage induced into secondary windings 33a&b.

Conversely, when FET 29 is pulsing on and off responsive to pulse generator 34, a pulsed current flows through winding 32 and induces the same pulsed signal into secondary windings 33a&b. When converter 30 is turned on FETs 35a&b are in a conducting state that allows current to flow through secondary windings 33a&b. The current flowing in winding 33a is rectified by diode 36a and the current flowing in winding 33b is rectified by diode 36b. The rectified signal flowing through diode 36a is stored on filter capacitor 37a, and the rectified signal flowing through diode 36b is stored on filter capacitor 37b. Capacitor 37a and resistor 28a form a filter for the rectified output from diode 36a, and capacitor 37b and resistor 2b form a filter for the rectified output from diode 36b. The voltage across filter capacitor 37a provides the output voltage at $V_{out}1$, and the voltage across filter capacitor 37b provides the output voltage at $V_{out}2$. Note that the rectifier diodes 36a&b can be eliminated by allowing the FET pull up resistors 41a&b to gate FETs 35a&b on during the power delivery half cycle.

Transformer 31 operates as a flyback transformer as shown by the phase dots on transformer windings 32 and 33a &b, but may also operate in the well known feed forward mode.

The output voltage at $V_{out}1$ is regulated in the following manner. A comparator 38a has a reference voltage input thereto as $V_{ref}1$. The other input of comparator 38a is connected via a resistor 27a to the output $V_{out}1$. Comparator 38a compares the voltages at its two inputs and provides an output that controls FET 35a.

When $V_{out}1$ is too low the output from comparator 38a causes FET 35a to conduct which thereby causes current to flow in secondary winding 33a and more charge is stored on filter capacitor 37a and increases $V_{out}1$. At the same time, DC pulses are being applied to primary winding 32 as described hereinafter. In flyback mode of operation power is delivered to the transformer secondary windings 33a&b on the half cycles during which the primary winding FET 29 is not conducting.

When $V_{out}1$ is in range there is no output from comparator 38a and FET 35a ceases conducting. There is no current flowing through primary winding 33a and the voltage across filter capacitor 37a decreases as it discharges. In this manner $V_{out}1$ can never be too high. The operation of the circuitry connected to secondary winding 33b is identical to the circuitry connected to winding 33a so the operation is not repeated.

The error signal output from each of comparators 38a&b is connected to an input of OR gate 39. If either or both of comparators 38a&b is providing an error signal output indicating that the voltage at their associated output is low, the output of OR gate 39 goes high. For example, let us assume that comparator 38a is providing the error signal output. This low voltage indication is output from OR gate 34 and is coupled via optical isolator 40 to binary switch controller 34 which causes the controller to operate and provide a fixed frequency, fixed pulse width pulse train to the gate of FET 29. Optical isolator 40 provides complete electrical isolation between the circuitry on the primary side of transformer 31 and the circuitry on the secondary side of the transformer. Responsive to the pulse train output from binary switch controller 34, FET 29 alternates between its conducting and non-conducting state at the same frequency. The result is that pulsed current flows through primary winding 32 having the same fixed frequency and pulse width as the pulses generated by binary switch controller 34.

The pulsed current flowing in primary winding 32 induces a pulsed voltage in each of secondary windings 33a&b in a manner well known in the transformer art. As described above comparator 38a generated the voltage low error signal that caused this. The error signal from comparator 38a also causes FET 35a to conduct, and a pulsed current flows through winding 33a, is rectified by diode 36a and charges filter capacitor 37a. This increases the voltage across filter capacitor 37a and thereby raises the voltage at $V_{out}1$. Regulation has been achieved.

When $V_{out}1$ increases to the proper level, comparator 38a senses this and ceases generating the error signal that caused FET 35a to conduct. Two things happen. First, there is no output from OR gate 39 and binary switch controller 34 ceases to provide a pulsed output with causes FET 29 to switch between its conducting to its non-conducting states. Second, comparator 38a causes its associated FET 35a to cease conduction. In the event that comparator 38b has generated an error signal that causes binary switch controller 34 to continue operating, this does not affect $V_{out}1$ because FET 35a is not conducting. Since FET 35a is not conducting $V_{out}1$ can never be too high. However, with comparator 38b generating its voltage error signal, its FET 35b is conducting and there is pulsed current flowing in primary winding 32 and secondary winding 33b. Filter capacitor 37b is charged and increases $V_{out}2$. In this manner only the converter output that needs adjustment is adjusted to stay in range.

Figure 2:
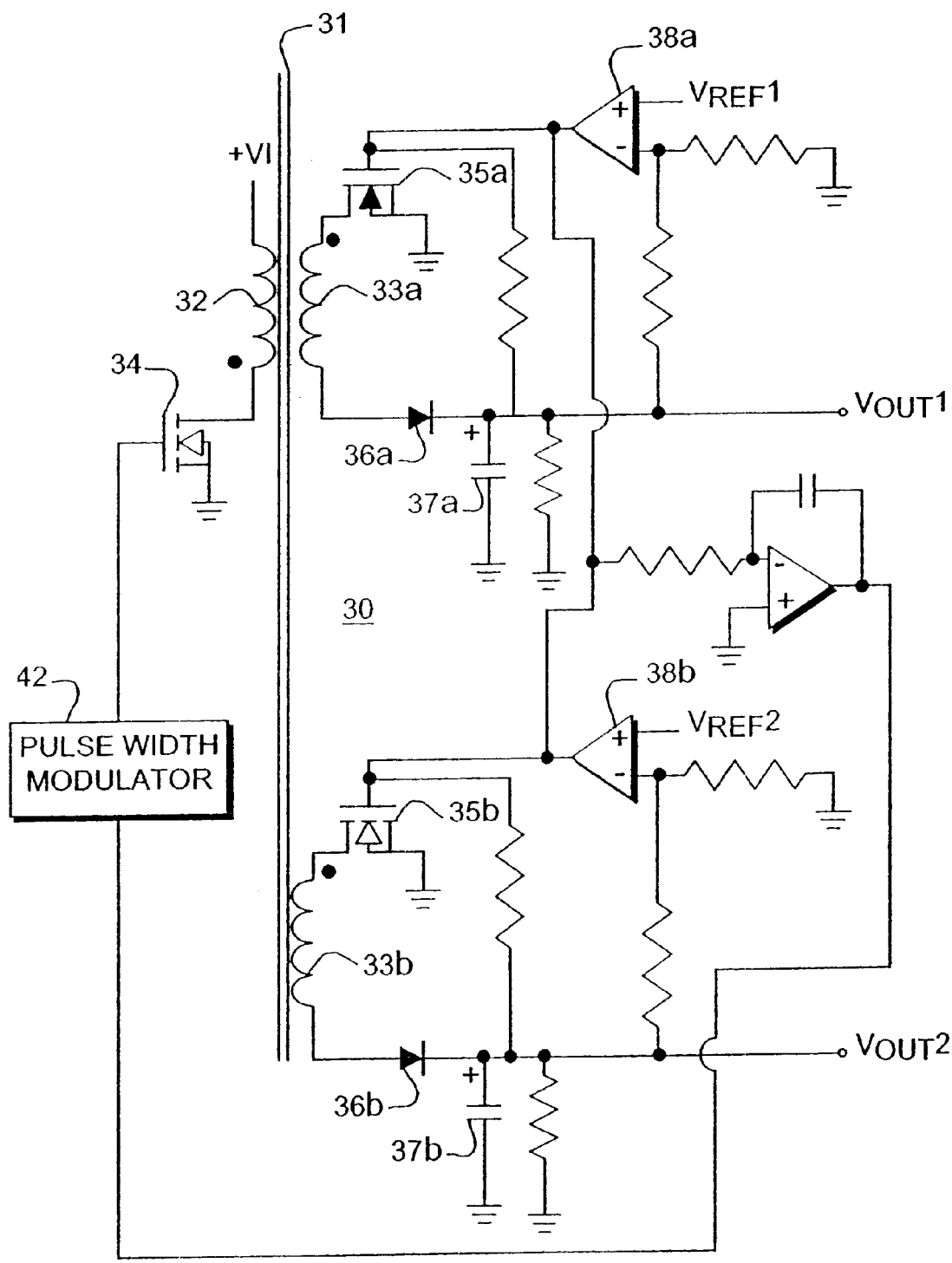
FIG. 2 shows another DC converter utilizing the invention in accordance with an alternative embodiment of the invention.

FIG. 2 shows a DC converter that utilizes an alternative embodiment of the invention. The circuitry associated with each secondary winding 33a&b of the converter transformer 31 is identical to that shown and described with reference to FIG. 1, so is not described again. The difference is in the control of pulsed current flowing in the primary winding 32 of the converter transformer 31. Instead of the voltage error signal output from each of comparators 38a&b being combined in an OR gate, they are instead integrated using integrator 41. The signal output from integrator 41 is not a binary signal, but is rather an analog signal. Primary winding 32 of the converter transformer 31 is not driven by a fixed frequency, fixed pulsed width signal in this case, but utilizes a prior art pulse width modulator 42. Modulator 42 is responsive to one or both of comparators 38a&b providing an output voltage error signal to generate two different voltage levels which cause pulse width modulator 42 to adjust the width of the pulses in a pulse train that it generates to compensate for the particular level of demand. Pulses output from modulator 42 cause FET 29 to conduct or not conduct and thereby cause a pulsed current to flow in primary winding 32 having the same frequency and pulse width as the pulsed signal output from pulse width modulator 42. The remainder of the operation is as described with reference to FIG. 1.

Figure 3:
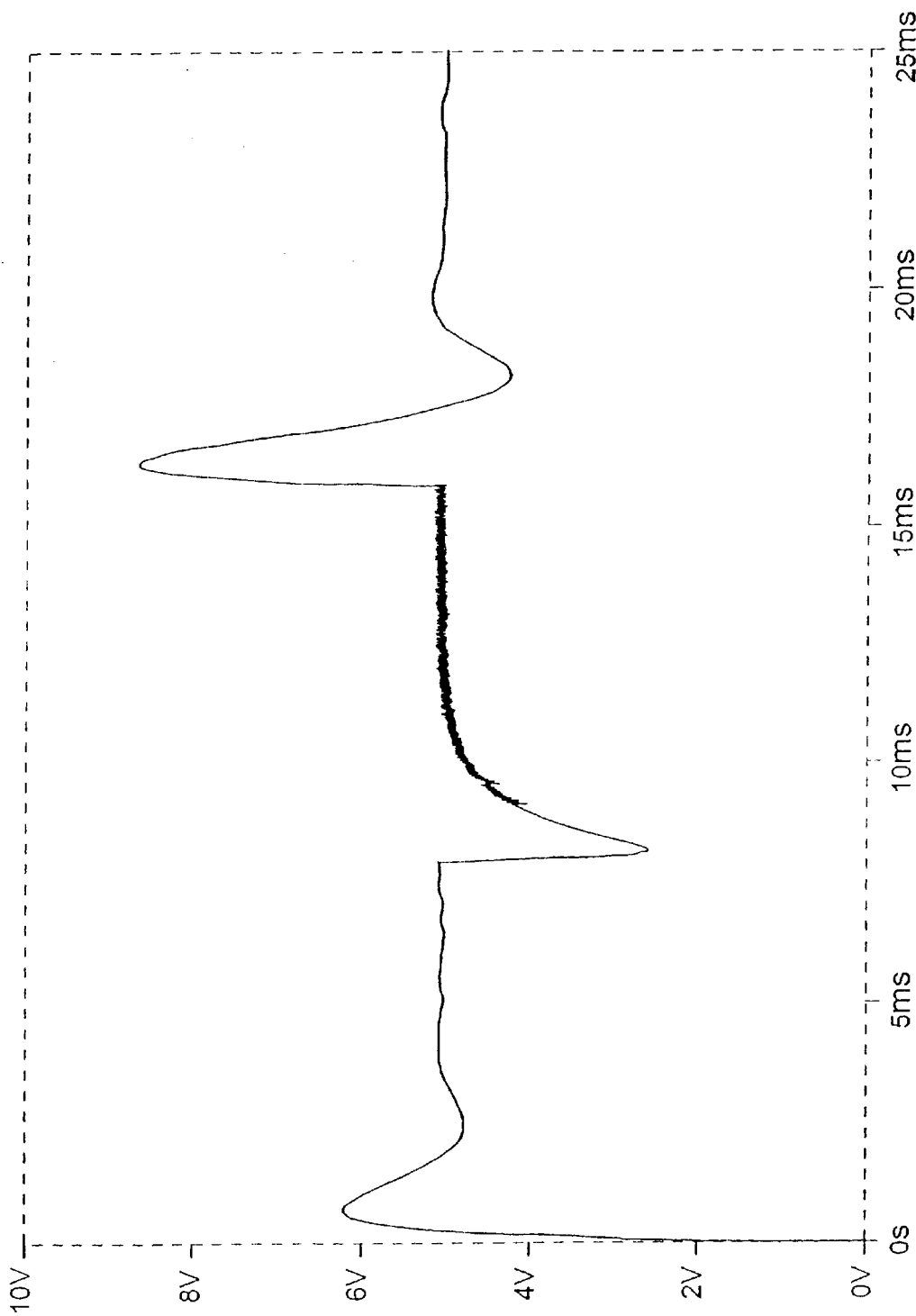
FIG. 3 shows overshoot inherent in a prior art DC converter when subject to step loads.

In FIG. 3 is shown overshoot of the output voltage caused by the transient response of a prior art DC converter of which a load is changed in a step fashion. Shown is a period of twenty-five milliseconds from turn-on of the converter. At zero time the converter is turned on with a one ampere load. At eight milliseconds the load is changed to a ten ampere load, and at sixteen milliseconds the load is changed back to a one ampere load. Overshoot caused by hysterisis in the prior art DC converter is apparent. The hysterisis is caused by the response delay inherent in prior art DC converters. Some of this response delay comes from the fact that error signals are averaged over time and can only control the average output voltage. It can be seen in this Figure that ripple is not constant over different loads in the prior art. Ripple is greater at larger current loads and visa versa.

Figure 4:
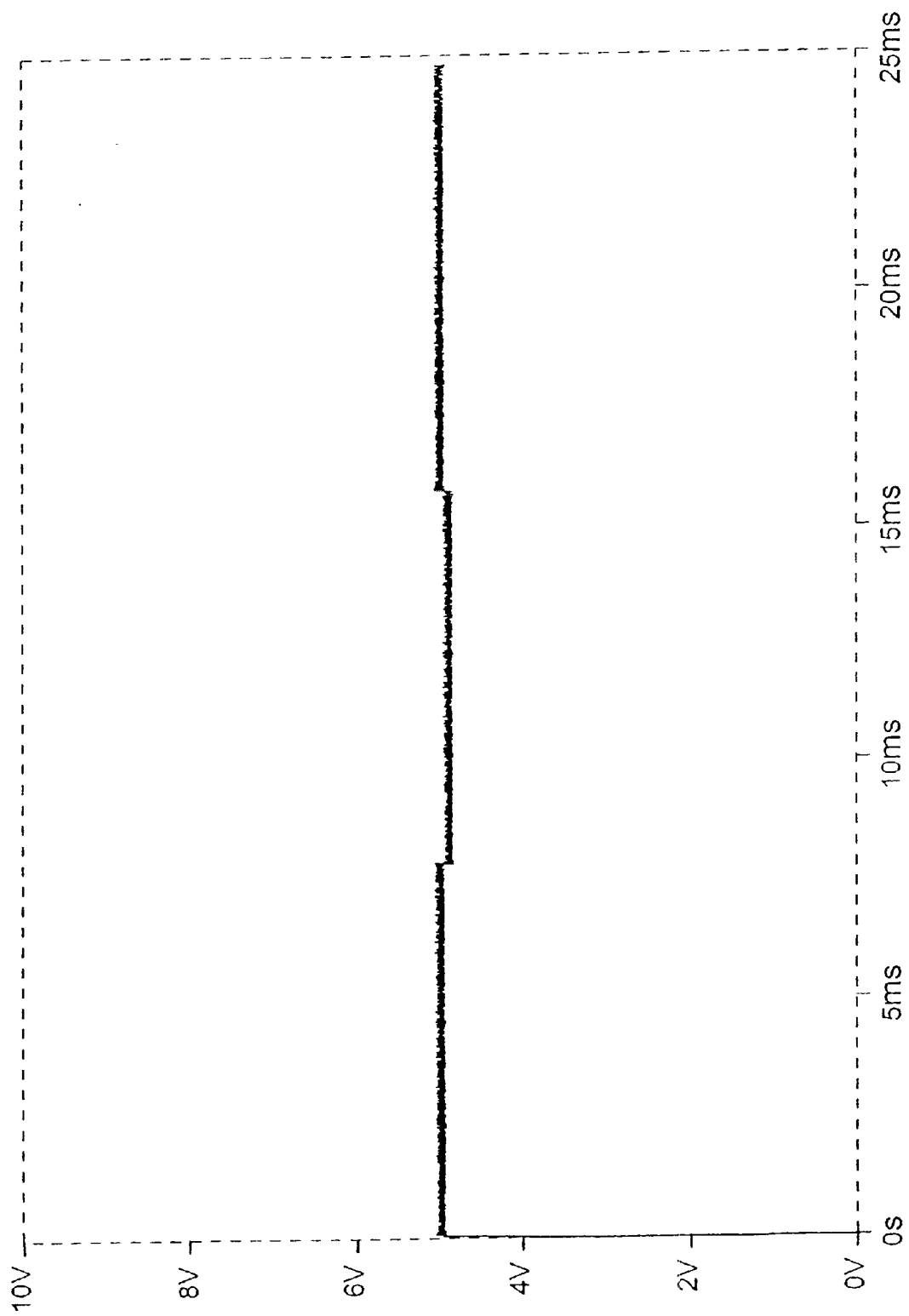
FIG. 4 shows the minimum overshoot in a DC converter utilizing the teaching of the present invention.

In FIG. 4 is shown the response of a DC converter implementing the present invention to the same step load conditions described in the previous paragraph and plotted on the same time and voltage scale as FIG. 3. At zero time the converter is turned on with a one ampere load. At eight milliseconds the load is changed to a ten ampere load, and at sixteen milliseconds is changed back to a one ampere load. It can be seen that there is very little or no overshoot and undershoot. This is a result of the speed at which the DC converter using the switching circuit of the present invention can respond to step load conditions. This occurs because there is no averaging of error signals. As soon as an output voltage is detected as being out of limits, an immediate change is made to correct the voltage. It is evident from this comparison that the DC converter of the present invention is clearly superior to DC converters of the prior art. It can also be seen in this Figure that, in contrast to the prior art as shown in FIG. 3, ripple is constant for different current loads.

While what has been disclosed herein is the preferred embodiment of the invention, it will be evident to those skilled in the art that numerous changes may be made without departing from the spirit and scope of the invention.

What is claimed is:

1. A switching circuit, comprising:
    a primary coil;
    a plurality of secondary coils coupled to said primary coil;
    a plurality of output circuits, each of said plurality of output circuits coupled to a respective one of said plurality of secondary coils, and adapted to produce an output voltage in response to energy coupled to its said respective secondary coil;
    each of said plurality of output circuits including at least one voltage comparator, for comparing the respective output voltage of a given output circuit with a reference voltage for said given output circuit, and for providing a voltage comparator output signal indicating whether said output voltage is greater or less than said reference voltage for said given output circuit; and
    each of said plurality of output circuits further including a switch, responsive to said voltage comparator output signal for said respective output circuit, for electrically disconnecting said respective output circuit from its respective secondary coil when said voltage comparator output signal indicates that said output voltage is greater than said reference voltage for said given output circuit, said switch for one respective output circuit not affecting the connection or disconnection of other output circuits from their respective secondary coils.

2. The circuit of claim 1 further including:
a first switch, responsive to a logic signal, for coupling a source of energy to said primary coil; and
a logic circuit, responsive to each said voltage comparator output signal, for providing said logic signal whenever at least one of said voltage comparators indicates that its respective output voltage has a value which is less than the value of its respective said reference voltage for said given output circuit.

3. The circuit of claim 2 wherein said logic circuit includes a logical OR circuit having a plurality of separate inputs and one output, each one of said plurality of separate inputs responsive to a given one voltage comparator output signal, and wherein said logical OR circuit output signal provides said logic signal.

4. The circuit of claim 1 wherein each of said plurality of voltage comparators includes a voltage differential value by which each respective output voltage value must differ from said reference voltage value for a given output circuit before said voltage comparator provides a respective said voltage comparator output signal indicating whether said output voltage is greater or less than said reference voltage for said given output circuit.

5. The circuit of claim 1 wherein each of said plurality of output circuit switch is further responsive to said voltage comparator output signal for said respective output circuit, for electrically connecting said respective output circuit to its respective secondary coil when said voltage comparator output signal indicates that said output voltage is less than said reference voltage for said given output circuit.

6. The circuit of claim 2 further including an electrical isolator circuit, coupled between said logic circuit and said first switch, for electrically isolating said logic circuit and said logic signal from first switch.

7. The circuit of claim 6 wherein said electrical isolator circuit includes an optical isolator.

8. The circuit of claim 6 wherein said source of energy includes pulsed DC energy.

9. A switching circuit, comprising:
a primary coil;
a first switch, responsive to a logic signal, for coupling a source of energy to said primary coil;
a plurality of secondary coils coupled to said primary coil;
a plurality of output circuits, each of said plurality of output circuits coupled to a respective one of said plurality of secondary coils, and adapted to produce an output voltage in response to energy coupled to its said respective secondary coil;
each of said plurality of output circuits including at least one voltage comparator, for comparing the respective output voltage of a given output circuit with a reference voltage for said given output circuit, and for providing a voltage comparator output signal indicating whether said output voltage is greater or less than said reference voltage for said given output circuit;
each of said plurality of output circuits further including a switch, responsive to said voltage comparator output signal for said respective output circuit, for electrically disconnecting said respective output circuit from its respective secondary coil when said voltage comparator output signal indicates that said output voltage is greater than said reference voltage for said given output circuit, said switch for one respective output circuit not affecting the connection or disconnection of other output circuits from their respective secondary coils; and
a logic circuit including a logical OR circuit having a plurality of separate inputs and one output, each one of said plurality of separate inputs responsive to a given one voltage comparator output signal, for providing said logic signal whenever at least one of said voltage comparators indicates that its respective output voltage has a value which is less than the value of its respective said reference voltage for said given output circuit.

10. A switching circuit, comprising:
a primary coil;
a first switch, responsive to a logic signal, for coupling a source of energy to said primary coil;
a plurality of secondary coils coupled to said primary coil;
a plurality of output circuits, each of said plurality of output circuits coupled to a respective one of said plurality of secondary coils, and adapted to produce an output voltage in response to energy coupled to its said respective secondary coil;
each of said plurality of output circuits including at least one voltage comparator, for comparing the respective output voltage of a given output circuit with a reference voltage for said given output circuit, and for providing a voltage comparator output signal indicating whether said output voltage is greater or less than said reference voltage for said given output circuit, each of said plurality of voltage comparators including a voltage differential value by which each respective output voltage value must differ from said reference voltage value for a given output circuit before said voltage comparator provides a respective said voltage comparator output signal indicating whether said output voltage is greater or less than said reference voltage for said given output circuit;
each of said plurality of output circuits further including a switch, responsive to said voltage comparator output signal for said respective output circuit, for electrically disconnecting said respective output circuit from its respective secondary coil when said voltage comparator output signal indicates that said output voltage is greater than said reference voltage for said given output circuit, said switch for one respective output circuit not affecting the connection or disconnection of other output circuits from their respective secondary coils; and
a logic circuit including a logical OR circuit having a plurality of separate inputs and one output, each one of said plurality of separate inputs responsive to a given one voltage comparator output signal, for providing said logic signal whenever at least one of said voltage comparators indicates that its respective output voltage has a value which is less than the value of its respective said reference voltage for said given output circuit.

11. A switching circuit, comprising:
a primary coil;
a first switch, responsive to a logic signal, for coupling a source of energy to said primary coil;
a plurality of secondary coils coupled to said primary coil;
a plurality of output circuits, each of said plurality of output circuits coupled to a respective one of said plurality of secondary coils, and adapted to produce an output voltage in response to energy coupled to its said respective secondary coil;
each of said plurality of output circuits including at least one voltage comparator, for comparing the respective output voltage of a given output circuit with a reference voltage for said given output circuit, and for providing a voltage comparator output signal indicating whether said output voltage is greater or less than said reference voltage for said given output circuit, each of said plurality of voltage comparators including a voltage differential value by which each respective output voltage value must differ from said reference voltage value for a given output circuit before said voltage comparator provides a respective said voltage comparator output signal indicating whether said output voltage is greater or less than said reference voltage for said given output circuit;

each of said plurality of output circuits further including a switch, responsive to said voltage comparator output signal for said respective output circuit, for electrically disconnecting said respective output circuit from its respective secondary coil when said voltage comparator output signal indicates that said output voltage is greater than said reference voltage for said given output circuit, said switch for one respective output circuit not affecting the connection or disconnection of other output circuits from their respective secondary coils;

a logic circuit including a logical OR circuit having a plurality of separate inputs and one output, each one of said plurality of separate inputs responsive to a given one voltage comparator output signal, for providing said logic signal whenever at least one of said voltage comparators indicates that its respective output voltage has a value which is less than the value of its respective said reference voltage for said given output circuit; and an electrical isolator circuit, coupled between said logic circuit and said first switch, for electrically isolating said logic circuit and said logic signal from first switch.

12. A switching circuit, comprising:

a primary coil;

a first switch, responsive to a logic signal, for coupling a source of pulsed energy to said primary coil;

a plurality of secondary coils coupled to said primary coil;

a plurality of output circuits, each of said plurality of output circuits coupled to a respective one of said plurality of secondary coils, and adapted to produce an output voltage in response to energy coupled to its said respective secondary coil;

each of said plurality of output circuits including at least one voltage comparator, for comparing the respective output voltage of a given output circuit with a reference voltage for said given output circuit, and for providing a voltage comparator output signal indicating whether said output voltage is greater or less than said reference voltage for said given output circuit;

each of said plurality of output circuits further including a switch, responsive to said voltage comparator output signal for said respective output circuit, for electrically disconnecting said respective output circuit from its respective secondary coil when said voltage comparator output signal indicates that said output voltage is greater than said reference voltage for said given output circuit, said switch for one respective output circuit not affecting the connection or disconnection of other output circuits from their respective secondary coils; and a logic circuit including a logical OR circuit having a plurality of separate inputs and one output, each one of said plurality of separate inputs responsive to a given one voltage comparator output signal, for providing said logic signal whenever at least one of said voltage comparators indicates that its respective output voltage has a value which is less than the value of its respective said reference voltage for said given output circuit.

* * * * *